United States Patent [19]

Müller et al.

[11] Patent Number: 4,728,676

[45] Date of Patent: Mar. 1, 1988

[54] THERMOSETTING REACTIVE RESIN MIXTURES AND A PROCESS FOR THE PRODUCTION OF MOLDINGS USING THESE MIXTURES

[75] Inventors: Hanns P. Müller, Odenthal; Dimitrios Kerimis, Cologne; Heinrich Heine; Walter Uerdingen, both of Leverkusen, all of Fed. Rep. of Germany

[73] Assignee: Bayer Aktiengesellschaft, Leverkusen, Fed. Rep. of Germany

[21] Appl. No.: 1,118

[22] Filed: Jan. 7, 1987

[30] Foreign Application Priority Data

Jan. 14, 1986 [DE] Fed. Rep. of Germany ....... 3600764

[51] Int. Cl.$^4$ ............................................. C08G 18/14
[52] U.S. Cl. .................................... 521/107; 521/108; 525/456; 528/51
[58] Field of Search ................ 521/107, 108; 525/456; 528/51

[56] References Cited

U.S. PATENT DOCUMENTS

| | | | |
|---|---|---|---|
| 4,070,416 | 1/1978 | Narahara et al. | 260/830 |
| 4,521,545 | 6/1985 | Kerimis et al. | 521/107 |
| 4,562,227 | 12/1985 | Rogler et al. | 524/786 |
| 4,564,651 | 1/1986 | Markert et al. | 524/589 |
| 4,582,723 | 4/1986 | Markert et al. | 427/116 |

FOREIGN PATENT DOCUMENTS

| | | |
|---|---|---|
| 129787 | 1/1985 | European Pat. Off. |
| 893240 | 4/1962 | United Kingdom |

*Primary Examiner*—Maurice J. Welsh
*Attorney, Agent, or Firm*—Gene Harsh; Joseph C. Gil; Lyndanne M. Whalen

[57] ABSTRACT

A thermosetting reactive resin mixture is made from an organic polyisocyanate, a polyepoxide and a heat activatable catalyst. The catalyst is a tertiary or quaternary ammonium salt of an alkylating or acidic ester of an organic phosphonic acid or of phosphoric acid. The polyisocyanate and polyepoxide are used in quantities such that the equivalent ratio of isocyanate groups to epoxide groups is from 1.2:1 to 70:1. These mixtures may be heated to produce plastics having excellent heat resistance, moisture and abrasion resistance, low dielectric losses and excellent molding properties.

9 Claims, No Drawings

THERMOSETTING REACTIVE RESIN MIXTURES AND A PROCESS FOR THE PRODUCTION OF MOLDINGS USING THESE MIXTURES

BACKGROUND OF THE INVENTION

This invention relates to reactive resin mixtures of organic polyisocyanates, organic polyepoxides and special catalysts and to a process for the production of moldings using these mixtures.

Plastics containing isocyanurate and oxazolidinone groups are known. They may be produced by polymerization of polyfunctional 1,2-epoxides with polyisocyanates in the presence of hardening catalysts (DE-OS 3,323,153, EP 0 130,454, DE-OS 3,323,084, DE-OS 3,323,123). Suitable hardening catalysts are, for example, tertiary amines and imidazoles, also onium halides and borates. Suitable thermolatent activators are addition complexes of boron trihalides with tertiary amines, imidazoles and morpholines.

The pot life of such mixtures may be lengthened somewhat by using tertiary amines of imidazoles deactivated by addition of electron acceptors such as 7,7,8,8-tetracyanoquinodimethane. All of these activator systems are expensive, difficult to handle or not sufficiently latent to lengthen the relatively short pot life of the reactive resin mixture enough to facilitate processing.

SUMMARY OF THE INVENTION

It is an object of the present invention to provide reactive resin mixtures based on organic polyisocyanates and organic polyepoxides which may be hardened by heating to form high-quality plastics containing isocyanurate and oxazolidinone groups. It is also an object of this invention to provide reactive resin mixtures which are substantially stable in storage at room temperature and the hardening of which may be interrupted at any time, so that the systems may be present in an intermediate "B-stage" (i.e. in a state in which they are solid at room temperature or moderately elevated temperature, but still fusible). This intermediate "B-stage" may be converted at a later stage, for example after size-reduction to powder form or dissolution in a suitable solvent, into a definitive, cross-linked and infusible end state by reheating in molds.

It is a further object of the invention to provide reactive resin mixtures which simplify the production and application of cast resin mixtures considerably. It is another object to provide mixtures having a long pot life thereby making it unnecessary to use complicated and unreliable cast-resin processing systems made up of batch or flow mixers because the supply for cast resins can be covered for several days by a single mixing process. Mixing errors are thus virtually ruled out and labor saved. It is also an object of this invention to provide reactive resin mixtures which may be used with particular advantage in the injection molding process according to DE-OS 2,017,506.

These and other objects which will be apparent to those skilled in the art are achieved by reactive resin mixtures made up of an isocyanate, a polyepoxide and a specific type of latent catalyst. These mixtures may be hardened to form plastics containing isocyanurate and oxazolidinone groups by heating.

DETAILED DESCRIPTION OF THE INVENTION

The present invention relates to thermosetting reactive resin mixtures containing
(a) at least one organic polyisocyanate,
(b) at least one organic compound containing at least two epoxide groups in a quantity such that the equivalent ratio of isocyanate groups to epoxide group is from 1.2:1 to 70:1,
(c) at least one heat-activatable catalyst, and optionally,
(d) other auxiliaries and additives.

The catalysts (c) are tertiary or quaternary ammonium salts of alkylating or acidic esters of organic phosphonic acids or phosphoric acid.

The present invention also relates to a process for the production of moldings by mixing
(a) at least one organic polyisocyanate with
(b) at least one organic compound containing at least two epoxide groups in a quantity corresponding to an equivalent ratio of isocyanate groups to epoxide groups of from 1.2:1 to 70:1,
(c) at least one heat-activatable catalyst and, optionally,
(d) other auxiliaries and additives, and heating the mixture thus prepared to temperatures of up to 250° C. before or during molding. Tertiary or quaternary ammonium salts of alkylating or acidic esters of organic phosphonic acids or phosphoric acid are used as the catalyst (c).

Component (a) of the mixtures of the present invention may be any of the organic polyisocyanates known to those skilled in polyurethane chemistry. Suitable polyisocyanates include aliphatic, cycloaliphatic, araliphatic, aromatic and heterocyclic polyisocyanates of the type described, for example, by W. Siefken in Justus Liebigs Annalen der Chemie, 562, pages 75 to 136. Examples of such polyisocyanates are those corresponding to the following formula

Q(NCO)$_n$ in which
n=2-4, preferably 2, and
Q is an aliphatic hydrocarbon radical containing from 2 to 18 (preferably from 6 to 10) carbon atoms, a cycloaliphatic hydrocarbon radical containing from 4 to 15 (preferably from 5 to 10) carbon atoms, an aromatic hydrocarbon radical containing from 6 to 15 (preferably from 6 to 13) carbon atoms or an araliphatic hydrocarbon radical containing from 8 to 15 (preferably from 8 to 13) carbon atoms.

Such polyisocyanates include: ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanato-methylcylohexane (DE-AS 1,202,785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4and 2,6-tolylene diisocyanate and mixtures of these isomers, diphenylmethane-2,4'- and/or -4,4'-diisocyanate and naphthylene-1,5-diisocyanate.

Other suitable polyisocyanates include: triphenylmethane-4,4′,4″38-triisocyanate, polyphenylpolymethylene polyisocyanates of the type obtained by phosgenation of aniline-formaldehyde condensates (GB 874,430 and GB 848,671), m- and p-isocyanatophenylsulfonyl isocyanates (U.S. Pat. No. 3,454,606), perchlorinated aryl polyisocyanates (U.S. Pat. No. 3,277,138), polyisocyanates containing cabodiimide groups (U.S. Pat. No. 3,152,162), norbornane diisocyanates (U.S. Pat. No. 3,492,330), polyisocyanates containing allophanate groups (GB 994,890), polyisocyanates containing isocyanurate groups (U.S. Pat. No. 3,001,973), polyisocyanates containing urethane groups (U.S. Pat. Nos. 3,394,164 and 3,644,457), polyisocyanates containing acylated urea groups (DE-PS 1,230,778), polyisocyanates containing biuret groups (U.S. Pat. Nos. 3,124,605 and 3,201,372), polyisocyanates produced by telomerization reactions (U.S. Pat. No. 3,654,106), polyisocyanates containing ester groups (U.S. Pat. No. 3,567,763), reaction products of the above-mentioned isocyanates with acetals (DE-PS 1,072,385) and polymeric polyisocyanates containing fatty acid esters (U.S. Pat. No. 3,455,883).

It is also possible to use the distillation residues containing isocyanate groups which accumulate in the commercial production of isocyanates, optionally in solution in one or more of the above-mentioned polyisocyanates. It is also possible to use mixtures of the above-mentioned polyisocyanates.

In general, it is preferred to use the commercially readily obtainable polyisocyanates, for example 2,4- and 2,6-tolylene diisocyanate, and mixtures of these isomers ("TDI"), particularly polyphenylpolymethylene polyisocyanates of the type obtained by phosgenation of aniline-formaldehyde condensates ("crude MDI") and polyisocyanates containing carbodiimide groups, urethane groups, allophanate groups, isocyanurate groups, urea groups or biuret groups ("modified polyisocyanates"). Modified polyisocyanates of the type derived from 2,4- and/or 2,6-tolylene diisocyanate and from 4,4'-and/or 2,4'-diphenylmethane diisocyanate are most preferred.

It is particularly preferred to use an isomer and/or homolog mixture of polyisocyanates of the diphenylmethane series containing more than 20% by weight of 2,4'-diisocyanatodiphenylmethane. These polyisocyanate mixtures are polyisocyanate mixtures of the diphenylmethane series containing more than 20 wt. % (preferably 30 to 70 wt. %) of 2,4'-diisocyanatodiphenylmethane. In addition to these 2,4'-isomers, these particularly preferred polyisocyanate mixtures contain other isomeric or homologous polyisocyanates of the diphenylmethane series. This means that the particularly preferred polyisocyanate is generally a mixture of 2,4'-diisocyanatodiphenylmethane with 4,4'-diisocyanatodiphenylmethane and optionally from 0 to 20 wt. %, based on the mixture as a whole, of 2,2'-diisocyanatodiphenylmethane or a mixture of these isomers with higher polyphenylpolymethylene polyisocyanates. The last-mentioned mixtures generally contain from 10 to 60 wt. %, based on the mixture as a whole, of these higher polyisocyanates. The first-mentioned diisocyanate mixtures enriched with 2,4'-isomers which may be used as the preferred polyisocyanate component may be obtained, for example, by distillation of a diisocyanate mixture having the indicated composition from a polyisocyanate mixture of the type obtained by phosgenation of aniline-formaldehyde condensates. The mixture containing higher polyisocyanates which may also be used with particular advantage may be obtained, for example, by remixing the last-mentioned distillation product with phosgenation product of depleted 4,4'-diisocyanatodiphenylmethane content, for example in accordance with the DE-AS 1,923,214. It is also possible to obtain directly a polyisocyanate mixture having the desired 2,4'-diisocyanatodiphenylmethane content by control of the aniline-formaldehyde condensation reaction. U.S. Pat. No. 3,277,173 for example describes a method of obtaining polyamine mixtures of the diphenylmethane series having a high 2,4'-diaminodiphenylmethane content. By phosgenation of these condensates rich in 2,4'-diaminodiphenylmethane, it is possible to obtain the particularly preferred polyisocyanates directly. Methods for obtaining polyisocyanate mixtures such as these are also described in DE-OS 1,937,685 and in U.S. Pat. No. 3,362,979. In the particularly suitable polyisocyanate mixtures containing higher polyisocyanates of the diphenylmethane series, the 2,4'-diisocyanatodiphenylmethane content is also above 20 wt. %, based on the mixture as a whole.

Component (b) may be any aliphatic, cycloaliphatic, aromatic or heterocyclic compound containing at least two epoxide groups i.e. 1,2-epoxide groups. The polyepoxides preferably used contain from 2 to 4, most preferably 2 epoxide groups per molecule and have an epoxide equivalent weight of from 90 to 500 and preferably from 170 to 220.

Suitable polyepoxides include: polyglycidylethers of polyhydric phenols such as pyrocatechol, resorcinol, hydroquinone, 4,4'-dihydroxydiphenylmethane, of 4,4'-dihydroxy-3,3'-dimethyldiphenylmethane, of 4,4'-dihydroxydiphenylmethane, 4,4'-dihydroxydiphenylcyclohexane, of 4,4'-dihydroxy-3,3'-dimethyldiphenylpropane, of 4,4'-dihydroxydiphenyl, of 4,4'-dihydroxydiphenylsulfone, of tris-(4-hydroxyphenyl)-methane, the chlorination and bromination products of the diphenols mentioned above, of novolaks (i.e. of reaction products of monohydric or polyhydric phenols with aldehydes, particularly formaldehyde, in the presence of acidic catalysts), of diphenols obtained by esterification of 2 moles of the sodium salt of an aromatic hydroxycarboxylic acid with 1 mole of a dihalogen alkane or dihalogen dialkylether (British Patent 1,017,612) or of polyphenols obtained by condensation of phenols and long-chain halogen paraffins containing at least two halogen atoms (GB-PS 1,024,288). Other suitable polyepoxides are polyepoxide compounds based on aromatic amines and epichlorohydrin such as N-di-(2,3-epoxypropyl)-aniline, N,N'-dimethyl-N,N'-diepoxypropyl-4,4'diaminodiphenylmethane, N-diepoxypropyl-4-aminophenylglycidylether (GB-PS 772,830 and 816,923).

It is also possible to use glycidylesters of polybasic aromatic, aliphatic and cycloaliphatic carboxylic acids (for example, phthalic acid diglycidylester, adipic acid diglycidylester) and glycidylesters of reaction products of 1 mole of an aromatic or cycloaliphatic dicarboxylic acid anhydride and ½ mole of a diol or 1/n mole of a polyol containing n hydroxy groups, or hexahydrophthalic acid diglycidylesters optionally substituted by methyl groups.

Glycidylethers of polyhydric alcohols such as 1,4-butane diol, 1,4-butene diol, glycerol, trimethylol propane, pentaerythritol and polyethylene glycols may also be used. Also of interest are triglycidyl isocyanurate, N,N'-diepoxypropyloxamide, polyglycidylthioethers of polyfunctional thiols (for example, of bis-mercaptomethylbenzene or diglycidyl trimethylene trisulfone) and polyglycidylethers based on hydantoins.

Finally, it is also possible to use epoxidation products of polyunsaturated compounds such as vegetable oils and conversion products thereof, epoxidation products of di- and polyolefins such as butadiene, vinylcyclohexene, 1,5-cyclooctadiene, 1,5,9-cyclododecatriene, polymers and copolymers containing epoxidizable double bonds, for example copolymers based on polybutadiene, polyisoprene, butadiene-styrene, divinylbenzene, dicyclopentadiene, unsaturated polyesters, also epoxidation products of olefins, which may be obtained by Diels-Alder addition and which may be converted into polyepoxides by epoxidation, or of compounds containing two cyclopentene or cyclohexene rings attached by bridge atoms or groups of bridge atoms. Polymers of unsaturated monoepoxides, for example of methacrylic acid glycidylester or allylglycidylether, may also be used.

The following polyepoxide compounds or mixtures thereof are preferably used as component (b): polyglycidylethers of polyhydric phenols, particularly bisphenol A: polyepoxide compounds based on aromatic amines, particularly bis-(N-epoxypropyl)-aniline, N,N'-dimethyl-N,N'-diepoxypropyl-4,4'-diaminodiphenylmethane and N-diepoxypropyl-4-aminophenylglycidylether: polyglycidylesters of cycloaliphatic dicarboxylic acids, particularly hexahydrophthalic acid diglycidylester, and polyepoxides of the reaction product of n moles hexahydrophthalic acid anhydride and 1 mole of a polyol containing n hydroxyl groups (n=an integer of from 2 to 6), more especially 3 moles hexahydrophthalic acid anhydride and 1 mole 1,1,1-trimethylolpropane, 3,4-epoxycyclohexylmethane-3,4-epoxycyclohexane carboxylate.

Liquid polyepoxides or low-viscosity diepoxides, such as bis-(N-epoxypropyl)-aniline or vinylcyclohexene diepoxide, may also be used. In special cases, these polyepoxides may further reduce the viscosity of already liquid polyepoxides or may convert solid polyepoxides into liquid mixtures.

Catalyst component (c) is a tertiary or quaternary ammonium salt of (1) an organic amine and (2) an alkylating or acidic ester of an organic phosphonic acid or of phosphoric acid.

Constituent (1) of the catalyst (c) may be any mono- or polyfunctional organic amine containing secondary or tertiary amino groups. In the production of the catalysts, secondary amino groups may be converted into tertiary ammonium groups by alkylation. Tertiary amino groups may be converted into tertiary ammonium groups by neutralization or into quaternary ammonium groups by quaternization. Suitable amines generally have a molecular weight of from 45 to 353 and preferably from 45 to 185. Typical examples of suitable amines are dimethylamine, trimethylamine, diethylamine, triethylamine, di-n-butylamine, tri-n-butylamine, N,N'-dimethylethylene diamine, N,N,N',N'-tetramethylethylene diamine, N,N-dimethylbenzylamine and triethylene diamine Constituent (2) for making the catalysts of the invention are alkylating or acidic esters of organic phosphonic acids or of phosphoric acid. Neutral, alkylating esters of organic phosphonic acids are preferably used as the phosphonic acid esters. These compounds generally have a molecular weight of from 124 to 214. Suitable compounds of this type include: methane phosphonic acid dimethylester, methane phosphonic acid diethylester, benzene phosphonic acid dimethylester, benzene phosphonic acid diethylester and ethane phosphonic acid diethylester. Suitable phosphoric acid esters are both monobasic acidic esters and neutral esters. These compounds generally have a molecular weight of from 126 to 266. Suitable compounds of this type include: dimethylphosphate, diethylphosphate, di-n-butylphosphate, triethylphosphate and tri-n-butylphosphate. Preferred constituents (2) are methane phosphonic acid dimethylester and di-n-butylphosphate.

The catalysts (c) essential to the invention are prepared in known manner (See for example Houben-Weyl, Vol. XII/2, pp. 262 et seq.) by reaction of constituents (1) and (2) in preferably equivalent quantities in the presence or absence of solvents at temperatures in the range of from 20° to 200° C.

It may be advantageous to produce these catalysts in an inert gas atmosphere and/or under pressure. It is also possible to use an excess of constituent (1) or (2) and then to remove any unreacted excess for example by distillation.

The following are particularly preferred examples of catalysts (c) suitable for use in accordance with the invention:

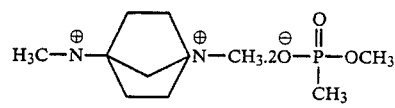

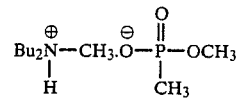

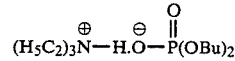

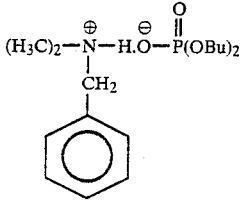

Based on 100 parts by weight of the mixture of the polyisocyanate component (a) and polyepoxide component (b), the catalyst (c) is used in a quantity of from 0.01 to 20 parts by weight and preferably in a quantity of from 0.1 to 10 parts by weight. It is of course also possible to use mixtures of different catalysts. In the preparation of the mixtures according to the invention, catalysts (c) which are solid at room temperature are preferably dissolved in component (b) prior to mixing with polyisocyanate component (a).

To prepare the mixture according to the invention, the essential components (a), (b) and (c) are mixed with one another. The quantity in which component (b) is used is gauged in such a way that components (a) and (b) are present in the mixture in quantities corresponding to an equivalent ratio of isocyanate groups to epoxide groups of from 1.2:1 to 70:1 and preferably of from 1.2:1 to 30.1.

The auxiliaries and additives (d) which may optionally be present in the mixtures according to the invention include for example, (d1) polymerizable, olefinically unsaturated monomers which are used in quantities of up to 100 wt. % and preferably in quantities of up to 50 wt. %, based on the total weight of components (a) and (b). Other auxiliaries and additives (d) which may optionally be used are, for example, (d2) organic compounds containing isocyanatereactive hydrogen atoms in such quantities that for every isocyanate group of component (a) there are up to 0.5 and preferably up to 0.4 active hydrogen atoms of component (d2). Where additives (d2) such as these are used, the equivalent ratio of isocyanate groups to epoxide groups is based on the isocyanate excess remaining after the reaction of the isocyanate groups with the active hydrogen atoms of additive (d2).

There is generally no need to use the auxiliaries (d1) and (d2). The additives (d1) are preferred to the additives (d2). Basically, however, it is also possible to use both types of additives at the same time. Where additives (d1) are used, it is possible, although generally not necessary, to use standard polymerization initiators such as, for example, benzoyl peroxide.

Typical examples of additives (d1) are olefinically unsaturated monomers which do not contain any NCO-reactive hydrogen atoms such as diisobutylene and styrene: $C_1$–$C_4$ alkylstyrenes, such as α-methylstyrene and α-butylstyrene; vinylchloride; vinylacetate: acrylic acid-$C_1$–$C_8$-alkylesters such as methylacrylate, butylacrylate or octylacrylate, the corresponding methacrylates, acrylonitrile or diallylphthalate. Mixtures of olefinically unsaturated monomers such as these may also be used. It is preferred to use styrene and/or (meth)-acrylic acid-$C_1$–$C_4$-alkylesters if the additives (d1) are used at all.

Examples of optional additives (d2) containing isocyanate-reactive hydrogen atoms are organic compounds generally containing from 2 to 8 (preferably from 2 to 3) alcoholic hydroxyl groups and having a molecular weight of from 62 to 2000, of the type known to be useful as synthesis components for polyurethanes. Examples are simple polyhydric alcohols such as ethylene glycol, hexamethylene glycol, glycerol or trimethylolpropane; polyhydroxyl compounds containing ester groups such as castor oil or polyhydroxypolyesters of the type obtainable by polycondensation of excess quantities of simple polyhydric alcohols with preferably dibasic carboxylic acids or their anhydrides (such as adipic acid, phthalic acid or phthalic acid anhydride), or polyhydroxy-polyethers of the type obtainable by addition of alkylene oxides (such as propylene oxide and/or ethylene oxide) onto suitable starter molecules (such as water, the simple alcohols just mentioned or even amines containing at least two aminic NH-bonds).

Other auxiliaries and additives (d) optionally used include (d3) known catalysts which accelerate the trimerization of isocyanate groups and/or the addition of isocyanate groups onto epoxide groups. In addition to the catalysts (c) essential to the invention, catalysts such as (d3) may be used when the reactivity of the mixtures according to the invention has to be adapted to a special application.

Suitable catalysts which accelerate the trimerization of isocyanate groups include: tertiary amines, such as triethylamine, tributylamine, N-methylmorpholine, N-ethylmorpholine, N,N,N',N'-tetramethylethylene diamine, pentamethyldiethylene triamine, 1,4-diazabicyclo-(222)-octane, bis-(dimethylaminoalkyl)-piperazines (DE-OS 2,636,787), N,N-dimethylbenzylamine, N,N-dimethylcyclohexylamine; monocyclic and bicyclic amidines (DE-OS 1,720,633); and bis-(dialkylamino)-alkylethers (U.S. Pat. No. 3,330,782, DE-AS 1,030,558, DE-OS 1,804,361 and DE-OS 2,618,280). Other suitable catalysts (d3) are Mannich bases of secondary amines such as dimethylamine, aldehydes, preferably formaldehyde, ketones such as acetone, methylethylketone or cyclohexanone, and phenols such as phenol, nonylphenol or bisphenol.

Other suitable catalysts (d3) are nitrogen-containing bases, such as tetraalkylammonium hydroxides: alkali hydroxides, such as sodium hydroxide; alkali phenolates, such as sodium phenolate; and alkali alcoholates such as sodium methylate. Hexahydrotriazines may also be used as catalysts (d3) (DE-OS 1,769,043).

Organometallic compounds, particularly organotin compounds, may also be used as catalysts (d3). Preferred organotin compounds are tin(II) salts of carboxylic acids, such as tin(II) acetate, tin(II) octoate, tin(II) ethylhexoate and tin(II) laurate, and tin(IV) compounds, for example dibutyltin oxide and dioctyltin diacetate.

Catalysts (d3) which accelerate the addition reaction of isocyanate groups with epoxide groups, are for example, the compounds mentioned in "Russian Chem. Reviews 52 (6), (1983), pages 576 to 593.

Other auxiliaries and additives (d) which may optionally be used include: fillers, pigments and plasticizers.

Suitable fillers include quartz powder, chalk and aluminum oxide.

Suitable pigments include titanium dioxide, iron oxide and organic pigments such as phthalocyanine pigments.

Suitable plasticizers include dioctylphthalate, tributyl and triphenylphosphate.

It is also possible to use soluble dyes or reinforcing materials such as, for example, glass fibers or glass cloths.

To produce the mixtures according to the invention, the individual components (a), (b), (c) and, optionally (d) are preferably mixed together at a temperature of from 0° to 40° C. and more preferably at a temperature of from 20° to 30° C. Reactive resin mixtures which have a pot life of at least 7 days at room temperature and which only show a chemical reaction above 60° C. are thus obtained. These mixtures may be hardened at temperatures above 60° C., i.e. in particular at temperatures of from 60° to 150° C. In order to obtain optimal properties, it is often advisable to post-harden the resulting plastics at temperatures of from 150° to 250° C. and preferably at temperatures of from 200° to 230° C.

According to another method the mixtures according to the invention are produced by mixing the polyisocyanate component (a) with tertiary ammonium salts of the kind exemplified hereinbefore and to add component (b) to this mixture only shortly before the use of the mixtures of the invention in accordance with the process of the invention. The optional component (d) may be admixed with the mixture of (a) and (c) or with component (b) or with the mixture of (a), (b) and (c). As it was found these special catalysts do not injure the storage stability of the polyisocyanate component (a) and only show their catalytic activity after the combination of the premixture of (a) and (c) with component (b).

Hardening may be interrupted at any time (e.g., by cooling to room temperature) and continued at a later stage. The moment at which the reaction is interrupted is best selected in such a way that the mixture obtained on cooling (for example to room temperature) is in the "B-stage" (i.e. solid) but becomes liquid again or rather formable under pressure on subsequent heating to the final hardening temperature. It is of particular advantage to interrupt the hardening process when the applications envisaged are laminates, molding compositions and coating compositions.

In one embodiment of the process of the present invention, the reactive resin mixtures prepared by mixing the individual components are exposed to a temperature of from 60° to 180° C. until the mixture is in a "B-stage" in which it is solid at 0° to 100° C. and preferably at 5° to 60° C. and still contains free isocyanate groups. This "B-stage" material may be size-reduced to powder and melted. The reaction product thus obtained may then be hardened by heating to 100° to 250° C. to form a crosslinked, infusible molding, optionally after size-reduction to a powder or after dissolution in a suitable solvent (e.g. acetone, methylethyl ketone, ethylacetate, ethyl-glycol acetate, chloroform, methylene chloride) and optionally after it has been mixed with other auxiliaries and additives (d). Hardening is carried out either after or with simultaneous forming in molds and after or with simultaneous removal of the solvent present, if any, by evaporation.

The process of the present invention is suitable for the production of heat-resistant plastics, particularly in the form of moldings, coatings and bonds of all kinds. This process may also be used for the production of impregnating compositions for electrical insulations and for glass-fiber-reinforced laminates. The mixtures of the present invention may also be used as cast resins and cable sealing compounds, particularly in the production of electrical components such as printed circuits, electronic watches, pocket calculators, electronic cameras, computers, microcomputers and digital information stores.

The heat resistance of the products obtained by the process of the present invention, their low dielectric losses, their resistance to moisture, their abrasion resistance and also their molding properties are excellent. In addition, the reactive resin mixtures of the invention are suitable for the production of class H and class C insulating materials for electric motors and generators, for the production of construction materials for aircraft, rockets or other heavily stressed machines. The mixtures may also be used, particularly in the "B-stage", as powder lacquer binders or as adhesives, particularly for thermoplasts. The reactive resin mixtures may also be used as cast resins for insulators, transformers, capacitors, laminates, for the production of tubes, vessels or sports equipment and even, in boat construction.

If suitable blowing agents are used, the process of the present invention may also be used for the production of foams.

In the following Examples, all of the percentages relating to the isocyanate content are percentages by weight.

EXAMPLES

EXAMPLE 1

A catalyst suitable for use in accordance with the invention was produced by stirring 112 parts by weight triethylene diamine (Dabco) and 1240 parts by weight methane phosphonic acid dimethylester for 8 hours at 100° C. while nitrogen was gently bubbled through. Approx. 400 parts by weight of the excess methane phosphonic acid ester were then distilled off in vacuo. The product precipitated was filtered off and then dried in vacuo. 355 parts by weight of a colorless crystalline compound were obtained.

EXAMPLE 2

A catalyst suitable for use in accordance with the invention was produced by mixing 258 parts by weight of di-n-butylamine and 248 parts by weight of methane phosphonic acid dimethylester and heating while stirring to 135°–150° C. The mixture was then cooled with an ice bath to such an extent that the temperature was kept at 140°–150° C. by the exothermic reaction. The reaction mixture was then stirred for 5 hours at 150° C.

The product obtained was freed from unreacted starting products by distillation in vacuo. 350 parts by weight of a colorless, viscous, gradually crystallizing liquid were obtained.

EXAMPLE 3

A catalyst suitable for use in accordance with the invention was produced by mixing 210 parts by weight of di-n-butylphosphate and 101 parts by weight of triethylamine together and stirring for 1 hour at 60° C.

EXAMPLE 4

A catalyst suitable for use in accordance with the invention was produced by mixing 210 parts by weight of di-n-butylphosphate and 135 parts by weight N,N-dimethylbenzylamine together and stirring for 1 hour at 60° C.

EXAMPLE 5

Model reactions for detecting isocyanurate and oxazolidinone formation 59.5 g (0.5 mole) phenylisocyanate or 62.5 g (0.5 mole) cyclohexylisocyanate and 75 g (0.5 mole) γ-phenoxypropylene oxide were stirred with 1% of the catalysts indicated in Table 1 in 134.5 g o-dichlorobenzene under the reaction conditions indicated until no more free isocyanate could be detected in the mixture. The quantity of isocyanurate and oxazolidinone was then determined by elemental analysis and quantitative gas chromatography.

TABLE 1

Elemental analysis and GC separation
Quantitative determination of oxazolidinone or isocyanurate formation from 59.5 g (0.5 mole)
phenylisocyanate, 75 g (0.5 mole) γ-phenoxypropylene oxide and 1% catalyst or 62.5 g (0.5 mole)
cyclohexylisocyanate.

| Batch | Isocyanate | Catalyst | Reaction Conditions | Oxazolidinone [g] | Isocyanurate [g] |
|---|---|---|---|---|---|
| I |  | | 15 mins./120° C. | 21.60 | 48.15 |

TABLE 1-continued

Elemental analysis and GC separation
Quantitative determination of oxazolidinone or isocyanurate formation from 59.5 g (0.5 mole)
phenylisocyanate, 75 g (0.5 mole) γ-phenoxypropylene oxide and 1% catalyst or 62.5 g (0.5 mole)
cyclohexylisocyanate.

| Batch | Isocyanate | Catalyst | Reaction Conditions | Oxazolidinone [g] | Isocyanurate [g] |
|---|---|---|---|---|---|
| II | C₆H₅—NCO | " | 15 mins./140° C. | 50.50 | 25.40 |
| III | C₆H₅—NCO | (H₉C₄)₂N⁺(CH₃)(H)·[O—P(=O)(O—CH₃)(CH₃)]⁻ | 5 mins./160° C. | 41.85 | 29.15 |
| IV | C₆H₅—NCO | (H₅C₂)₃N⁺—H·[O—P(=O)(OC₄H₉)₂]⁻ | 40 h/160° C. | 29.90 | 26.10 |
| V | H—C₆H₁₀—NCO | same as Batch III | 14 h/160° C. | 59.80 | 1.20 |

The tests clearly show that different quantities of isocyanurate and oxazolidinone are formed according to the isocyanate used and the catalyst used. At elevated temperature, oxazolidinone is formed in increased amounts, as shown by batches I and II where the same starting products but different temperatures were used.

EXAMPLE 6

95 parts by weight of a low-viscosity polyisocyanate mixture based on dipehnylmethane diisocyanate (MDI) containing 60% 2,4'- MDI and having an NCO-number of 33.6 and 5 parts by weight of a high-purity bisphenol-A-diglycidylether having an epoxide number of from 0.58 to 0.59 were mixed. 1 part by weight of the catalyst made in Example 3 was added to the resulting mixture. The mixture had an NCO content of 31.6% and a viscosity of 15.1 mPas at 25° C.

The NCO content of the mixture and its viscosity were determined after storage at room temperature:

| Days | 16 | 29 | 34 |
|---|---|---|---|
| % NCO | 28.2 | 21.3 | 16.3 |
| η25° C. mPas | 112 | 2928 | solid |

The ready-to-use cast resin mixture had a pot life of around 30 days in the liquid state.

Using the above-described reactive resin mixture, plates measuring 200 mm×300 mm×4 mm were cast and hardened. The mechanical and electrical properties of the moldings are shown in Table 2.

TABLE 2

Properties of the cast resin moldings

| Batch | | According to the invention |
|---|---|---|
| MDI as described in Ex. 6 | 95 | 95 |
| Bis-epoxide as described in Ex. 6 | 5 | 5 |
| Dimethylbenzylamine | 1 | — |
| Catalyst of Ex. 3 | — | 1 |

TABLE 2-continued

Properties of the cast resin moldings

| Batch | | According to the invention |
|---|---|---|
| Hardening | 4 h/80° C. + 16 H/220° C. | 8 h/120° C. + 16 h/220° C. |
| Tensile strength (MPa) | 45 | 54 |
| Breaking elongation (%) | 1.3 | 2.0 |
| E-modulus (MPa) | 3280 | 3570 |
| Flexural strength (MPa) | 116 | 99 |
| Peripheral fiber elongation at break (mm) | 2.5 | 2.37 |
| Impact strength (KJ/mm²) | 9 | 8 |
| Ball indentation hardness (MPa) | 245 | 240 |
| Martens value (°C.) | 250 | 250 |
| Pot life | 15–20 minutes | at least 7 days |
| Remark | occasional foaming | problem free hardening without foaming |
| Dielectric constant $\epsilon_r$ of the cast resin moldings according to the invention at | | |
| 23° C./50 Hz | | 3.43 |
| 50° C./50 Hz | | 3.45 |
| 80° C./50 Hz | | 3.45 |
| 23° C./1 kHz | | 3.30 |
| 23° C./1 MHz | | 3.21 |
| 100° C./50 Hz | | 3.43 |
| 150° C./50 Hz | | 3.43 |
| 200° C./50 Hz | | 3.40 |
| Dielectric loss factor tan δ of the cast resin moldings according to the invention at | | |
| 23° C./50 Hz | | 0.0063 |
| 50° C./50 Hz | | 0.0056 |
| 80° C./50 Hz | | 0.0047 |
| 23° C./1 kHz | | 0.0066 |
| 23° C./1 MHz | | 0.0087 |
| 100° C./50 Hz | | 0.0038 |
| 150° C./50 Hz | | 0.0024 |
| 200° C./50 Hz | | 0.0018 |

EXAMPLE 7

The procedure was as in Example 6, except that the described reactive resin mixture was heated to 120° C. in 19 minutes. The mixture was then poured out onto a plate with Teflon coating and powdered after cooling.

A B-stage of the reactive resin mixture storable at room temperature was obtained in this way. The powdered resin was readily soluble in acetone and methylethylketone. The solution could be used as liquid impregnating resins for impregnating glass fiber cloths or transformer windings.

The powdered resin had an NCO-content of 13.8%.

After storage at room temperature for 6 months, the NCO-content of the resin was 12.7%.

The powdered reactive resin was processed as follows:

60 g of powdered B-stage were introduced into and uniformly distributed in a cold 130 mm diameter mold coated with release agent. The mold was closed by means of a plunger and placed in a press heated to 200° C., followed by pressing for 60 minutes at 200° C. under a pressure of 25 mbar. The mold was then cooled under pressure to room temperature and the 3 mm thick round disc removed therefrom.

The disc was cut into standard test bars, some of which were then tempered.

The following test results were obtained:

TABLE 3

| Hardening | a<br>1 h/200° C. | b<br>1 h/200° C. +<br>6 h/200° C. | c<br>1 h/200° C. +<br>24 h/200° C. | d<br>1 h/200° C. +<br>6 h/250° C. |
|---|---|---|---|---|
| Flexural strength (MPa) | 82.4 | 93.3 | 98.4 | 87.3 |
| Peripheral fiber elongation (%) | 3.1 | 3.4 | 3.6 | 2.8 |
| Impact strength (kJ/m²) | 6.2 | 9.1 | 12.7 | 5.8 |
| Martens value (°C.) | 175 | 229 | 240 | 239 |

EXAMPLE 8

Various catalysts according to the invention were added to mixtures of the polyisocyanate mixture described in Example 6 and the bisphenol-A-diglycidylether. The viscosity and NCO-content of the resulting mixtures were determined after storage for 7 days at room temperature. A conventional accelerator, namely dimethylbenzylamine, was used for comparison.

TABLE 4

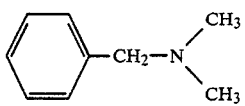

| | Parts by weight polyisocyanate | Parts by weight bis-epoxide | Catalyst 1% | 25° C. (mPas) | % NCO |
|---|---|---|---|---|---|
| Comparison | 95 | 5 | (DB) | crosslinked after 15 to 20 mins. | |
| | | | | after 7 days | |
| A | 95 | 5 | DB.HO—P(=O)(OBu)(OBu) | 18.1 | 31.4 |
| B | 95 | 5 | Example 3 | 46.9 | 31.4 |
| C | 90 | 10 | Example 3 | 26.0 | 28.9 |
| D | 80 | 20 | Example 3 | 40.2 | 25.7 |
| E | 125 | 170 | Example 3 | 279 | 14.0 |
| F | 250 | 68 | Example 3 | 51 | 24.7 |

Using the reactive resin mixtures described in Table 4, plates measuring 200 mm × 300 mm × 4 mm were cast. After treatment for 3 hours at 130° C., the temperature was kept at 180° C. for 24 hours and then at 200° C. for another 24 hours. The mechanical properties of the moldings are shown in Table 5.

TABLE 5

| | Reactive resin | | | | | |
|---|---|---|---|---|---|---|
| | A | B | C | D | E | F |
| Tensile strength (MPa) | 57 | 54 | 53 | 46 | 66 | 48 |
| Breaking elongation (%) | 1.8 | 1.8 | 1.6 | 1.5 | 1.9 | 1.5 |
| E-modulus in tension (MPa) | 3470 | 3570 | 3976 | 3680 | 4030 | 3920 |
| Flexural strength (MPa) | 109 | 90.9 | 81.6 | 76.4 | 95.4 | 69.2 |
| Peripheral fiber elongation (%) | 3.4 | 1.8 | 2.2 | 4.1 | 2.3 | 2.0 |
| Impact strength (kJ/m²) | 10.4 | 5.6 | 6.9 | 4.1 | 6.1 | 5.1 |
| Ball indentation hardness (MPa) | 234 | 235 | 281 | 248 | 218 | 250 |
| Martens value (°C.) | 236 | 227 | 236 | 249 | 124 | >250 |

EXAMPLE 9

380 parts by weight of the polyisocyanate mixture (MDI) described in Example 6, 40 parts by weight of an isocyanurate polyisocyanate based on hexamethylene diisocyanate having an NCO content of 21.6% and a viscosity of 2628 mPas/25° C., 20 parts by weight of bisphenol-A-diglycidylether and 4 parts by weight of the catalyst of Example 3 were intensively mixed. 1036 parts by weight quartz powder were then added to the mixture which thereafter was heated under nitrogen to 110° C.

The mixture had an NCO-content of 9.1%. The temperature was then increased to 120° C. and the reaction mixture was stirred for 1 hour at that temperature. Thereafter the NCO-content of the mixture fell to 4.57%.

The reactive resin was then poured onto a plate with Teflon coating and powdered after cooling. The powdered reactive resin had a softening point of from 90 to 100° C. and was processed as follows into moldings.

In the same way as described in Example 7, 80 g of the powder were processed in a round mold under pressure and heated to form a plate. The hardening conditions were 30 mins./200° C./25 bar.

The following properties were determined on the homogeneous molding:

| | |
|---|---|
| Ball indentation hardness (MPa) | 443 |
| Martens value (°C.) | 249 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermosetting reactive resin mixture comprising:
   (a) at least one organic polyisocyanate
   (b) at least one organic compound having at least two epoxide groups and
   (c) at least one heat activatable catalyst which is a tertiary or quaternary ammonium salt of an alkylating or acidic ester of organic phosphonic acid or phosphoric acid in quantities such that the equivalent ratio of isocyanate groups to epoxide groups is from 1.2:1 to 70:1.

2. The thermosetting resin mixture of claim 1 wherein the catalyst (c) is a tertiary ammonium salt prepared by neutralizing a tertiary amine with an acidic ester of phosphoric acid or by alkylating a secondary amine with an alkylating ester of an organic phosphonic acid or of phosphoric acid.

3. The thermosetting resin mixture of claim 1 which further comprises a polymerizable, olefinically unsaturated monomer and/or or a catalyst which accelerates trimerization of isocyanate groups and/or a catalyst for isocyanate addition reactions.

4. A process for the production of a molding in which the mixture of claim 1 is heated to a temperature of up to 250° C. prior to introduction into the mold or while it is being molded in a mold.

5. The process of claim 4 in which
   (a) the mixture of claim 1 is reacted at 60° to 180° C. to form a powderable and fusible reaction product which contains free isocyanate groups and is solid at 0° to 100° C. and
   (b) the reaction product of (a) is heated to a temperature of from 100° to 250° C. and molded to form a crosslinked infusible molding.

6. The process of claim 5 in which the reaction product formed in (a) is reduced to powder form before being heated in accordance with (b).

7. The process of claim 5 in which the mixture reacted in (a) further includes an additive selected from polymerizable, olefinically unsaturated monomer catalysts which accelerate trimerization of isocyanate groups, catalysts which acceletrate isocyanate addition reactions and combinations thereof.

8. The process of claim 7 in which the additive is combined with the reaction product formed in (a) before heating in accordance with (b).

9. The process of claim 5 in which the reaction product formed in (a) is dissolved in a solvent before being heated in accordance with (b) and the solvent is evaporated during molding in (b).

* * * * *